United States Patent
Liao et al.

(10) Patent No.: US 10,310,566 B2
(45) Date of Patent: Jun. 4, 2019

(54) FOLDABLE MECHANISM OF MOBILE TERMINAL AND MOBILE TERMINAL

(71) Applicant: HUAWEI TECHNOLOGIES CO., LTD., Shenzhen, Guangdong (CN)

(72) Inventors: Li Liao, Shenzhen (CN); Chia Huan Chang, Shanghai (CN); Xin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/119,102

(22) Filed: Aug. 31, 2018

(65) Prior Publication Data
US 2018/0373297 A1 Dec. 27, 2018

Related U.S. Application Data

(63) Continuation of application No. PCT/CN2017/102310, filed on Sep. 19, 2017.

(30) Foreign Application Priority Data

Sep. 20, 2016 (CN) .......................... 2016 1 0836223

(51) Int. Cl.
  *G06F 1/16* (2006.01)
  *H04M 1/02* (2006.01)
  *H04B 1/3827* (2015.01)
(52) U.S. Cl.
  CPC .............. *G06F 1/1681* (2013.01); *G06F 1/16* (2013.01); *G06F 1/1601* (2013.01);
  (Continued)
(58) Field of Classification Search
  CPC .............................. G06F 1/1652; G06F 1/1681
  See application file for complete search history.

(56) References Cited

U.S. PATENT DOCUMENTS 6,421,235 B2 * 7/2002 Ditzik .................. G06F 1/1616
                                                          320/114
6,577,496 B1 * 6/2003 Gioscia ................ G06F 1/1616
                                                          345/156
(Continued)

FOREIGN PATENT DOCUMENTS

CN         102710823 A    10/2012
CN         204069046 U    12/2014
(Continued)

OTHER PUBLICATIONS

International Search Report, dated Dec. 25, 2017, in International Application No. PCT/CN2017/102310 (5 pp.).
(Continued)

*Primary Examiner* — Adrian S Wilson
(74) *Attorney, Agent, or Firm* — Staas & Halsey LLP

(57) ABSTRACT

The present disclosure provides a foldable mechanism of a mobile terminal and the mobile terminal. The foldable mechanism includes a soft support structure and a hard support structure embedded in the soft support structure. The foldable mechanism formed by the soft support structure and the hard support structure embedded in the soft support structure is used as a component for connecting a first housing and a second housing. When the mobile terminal is unfolded, the foldable mechanism formed by the soft support structure and the hard support structure is unfolded and turns into a flat structure connected to the first housing and the second housing. When the mobile terminal is folded, one side of the soft support structure away from the hard support structure shrinks inward. Therefore, the mobile terminal is prevented from having an abrupt exterior structure, and an exterior effect of the mobile terminal is improved.

18 Claims, 7 Drawing Sheets

(52) U.S. Cl.
CPC .......... *G06F 1/1616* (2013.01); *G06F 1/1652* (2013.01); *H04M 1/02* (2013.01); *H04B 1/3833* (2013.01)

(56) References Cited

U.S. PATENT DOCUMENTS

| | | | |
|---|---|---|---|
| 9,506,279 B2* | 11/2016 | Kauhaniemi | G06F 1/1652 |
| 9,811,119 B2* | 11/2017 | Seo | G06F 1/1652 |
| 9,818,961 B2* | 11/2017 | Hiroki | H01L 51/0097 |
| 9,898,051 B2* | 2/2018 | Cho | G06F 1/1616 |
| 9,927,841 B2* | 3/2018 | Gheorghiu | G06F 1/1652 |
| 2002/0067339 A1* | 6/2002 | Min | G06F 1/1601 345/156 |
| 2007/0117600 A1* | 5/2007 | Robertson, Jr. | H04M 1/0216 455/575.3 |
| 2010/0164837 A1* | 7/2010 | Kao | G06F 1/1616 345/1.3 |
| 2012/0147542 A1* | 6/2012 | Kim | G06F 1/1601 361/679.28 |
| 2012/0307423 A1* | 12/2012 | Bohn | G06F 1/1641 361/679.01 |
| 2012/0307472 A1* | 12/2012 | Bohn | G06F 1/1616 361/807 |
| 2013/0216740 A1* | 8/2013 | Russell-Clarke | B23K 26/38 428/33 |
| 2014/0196254 A1* | 7/2014 | Song | E05D 3/14 16/302 |
| 2014/0217875 A1* | 8/2014 | Park | H05K 5/0226 312/326 |
| 2015/0055287 A1* | 2/2015 | Seo | G06F 1/1652 361/679.27 |
| 2015/0077917 A1* | 3/2015 | Song | G06F 1/1652 361/679.27 |
| 2015/0176317 A1* | 6/2015 | Lee | E05D 3/06 16/251 |
| 2015/0257290 A1 | 9/2015 | Lee et al. | |
| 2015/0330614 A1 | 11/2015 | Lee et al. | |
| 2016/0062412 A1 | 3/2016 | Park et al. | |
| 2016/0139634 A1 | 5/2016 | Cho et al. | |
| 2016/0187935 A1* | 6/2016 | Tazbaz | G06F 1/1681 361/679.03 |
| 2016/0224072 A1* | 8/2016 | Huang | E05D 7/06 |
| 2018/0077810 A1* | 3/2018 | Moon | G06F 1/1618 |

FOREIGN PATENT DOCUMENTS

| | | |
|---|---|---|
| CN | 104900149 A | 9/2015 |
| CN | 105096756 A | 11/2015 |
| CN | 105549690 A | 5/2016 |
| CN | 205446377 U | 8/2016 |
| KR | 101467857 B1 | 12/2014 |
| WO | 2012/167204 A2 | 12/2012 |

OTHER PUBLICATIONS

Written Opinion of the International Searching Authority, dated Dec. 25, 2017, in International Application No. PCT/CN2017/102310 (7 pp.).
Extended European Search Report dated Aug. 24, 2018, in corresponding European Patent Application No. 17852359.3, 7 pgs.

* cited by examiner

FOLDABLE MECHANISM OF MOBILE TERMINAL AND MOBILE TERMINAL

CROSS-REFERENCE TO RELATED APPLICATIONS

This application is a continuation of International Application No. PCT/CN2017/102310, filed on Sep. 19, 2017, which claims priority to Chinese Patent Application No. 201610836223.0, filed on Sep. 20, 2016. The disclosures of the aforementioned applications are hereby incorporated by reference in their entireties.

TECHNICAL FIELD

The present disclosure relates to the field of mobile terminal technologies, and in particular, to a foldable mechanism of a mobile terminal and the mobile terminal.

BACKGROUND

As flexible foldable screen technologies are increasingly mature, foldable terminal products will also be a main trend in the future. A foldable terminal product (for example, an electronic device such as a foldable mobile phone, a foldable tablet, or a foldable computer) needs to have a relatively good ID exterior, so that the product can be accepted by consumers. Using a foldable mobile phone as an example, different from a conventional flip phone, a flexible foldable mobile phone has a screen that can be continuously folded. To ensure that the foldable screen is not pulled or squeezed, a middle hinge folding part of an entire exterior of the product is largely deformed, but a general structure cannot implement such large deformation. Therefore, all foldable mechanisms in the prior art are foldable mechanisms implemented by using a mechanical linkage mechanism, and complexity is relatively high. In addition, when a component of the mechanical linkage mechanism moves, an exterior effect of a mobile terminal is impaired unavoidably.

SUMMARY

Embodiments of the present invention provide a foldable mechanism of a mobile terminal and the mobile terminal to improve an effect of the mobile terminal when the mobile terminal is bent.

Embodiments of the present invention provide a foldable mechanism of a mobile terminal. The foldable mechanism includes a soft support structure that connects a first housing and a second housing of the mobile terminal, where the soft support structure includes a plurality of V-shaped supports arranged in a single row, open ends of adjacent V-shaped supports are connected, and an opening of each V-shaped support faces a flexible display screen of the mobile terminal; the foldable mechanism further includes a hard support structure that is disposed in each V-shaped support and configured to support the flexible display screen, where each hard support structure blocks two ends of a V-shaped support corresponding to the hard support structure; and the foldable mechanism further includes a blocking layer disposed between bending tip portions of any two adjacent V-shaped supports;

when the foldable mechanism of the mobile terminal is bent, bending tip portions of the plurality of V-shaped supports converge, and each blocking layer is compressed into a gap between two V-shaped supports connected by the blocking layer; and when the foldable mechanism of the mobile terminal is unfolded, the bending tip portions of the plurality of V-shaped supports move away from each other, and each blocking layer is unfolded to block the gap between the two V-shaped supports connected by the blocking layer.

In the foregoing technical solution, the foldable mechanism formed by the soft support structure and the hard support structure embedded in the soft support structure is used as a component for connecting the first housing and the second housing. When the mobile terminal is unfolded, the foldable mechanism formed by the soft support structure and the hard support structure is unfolded and turns into a flat structure connected to the first housing and the second housing. When the mobile terminal is folded, one side of the soft support structure away from the hard support structure shrinks inward, and one side of the soft support structure located on the hard support structure is also extended and bent, so that the entire foldable mechanism forms a C-shaped structure to implement bending of the first housing and the second housing. In the foregoing bending process, the flexible screen is supported by the hard support structure, and the shape of the foldable mechanism is changed according to a change of the soft support structure. Therefore, continuity of connections between the foldable mechanism and the first housing and the second housing is improved, the mobile terminal is prevented from having an abrupt exterior structure, and an exterior effect of the mobile terminal is improved.

In a specific implementation solution, a plurality of blocking layers are a bending plate of an integrated structure, a plurality of creases are disposed on the bending plate, the bending tip portions of the plurality of V-shaped supports are fixedly connected to the creases on the bending plate at equal intervals, and an odd number of creases exist between adjacent V-shaped supports. That is, the blocking layers use the bending plate to block a gap formed by tip ends of the plurality of V-shaped supports. This improves the exterior effect of the entire mobile terminal. In addition, when being bent, the bending plate occupies less space. Therefore, the exterior effect after the entire structure is bent can be ensured.

In another implementation solution, at least one blocking layer in a plurality of blocking layers is a bending piece, an odd number of creases exist on the bending piece, and two ends of the bending piece are respectively connected to bending tip portions of V-shaped supports on two sides of the blocking layer on a one-to-one basis. That is, the blocking layer may use a structure of a bending piece. There is no great structural difference between the bending piece and the foregoing bending plate. The only difference is that the bending piece in this solution is located between two V-shaped supports. In addition, in this solution, when all blocking layers use bending pieces as described above, after the bending pieces are connected, there is no great structural difference from the bending plate. However, the blocking layer in this solution not only uses the structure of the bending piece, but also may use another foldable mechanism. Therefore, the V-shaped support may be blocked by using different structures. In a specific solution, one crease exists on each bending piece. That is, when being bent, the bending piece needs to be bent only once to fit into the gap between the V-shaped supports. This improves convenience during deformation, reduces a thickness of the bending piece after the bending piece is folded, and improves an effect after the bending piece is bent.

In addition, in a third implementation solution, at least one blocking layer in the plurality of blocking layers includes an elastic material layer disposed between adjacent V-shaped supports. That is, the gap between the V-shaped supports is filled with the elastic material layer. After the foldable mechanism is bent, the elastic material layer is compressed and deformed, so that the foldable mechanism can be bent. When being unfolded, the elastic material recovers to an initial state, and can effectively block the gap between the V-shaped supports. In a specific implementation, each blocking layer may use an elastic material layer. Alternatively, only some blocking layers use elastic material layers.

In a fourth implementation solution, some blocking layers may use bending pieces, and other blocking layers may use elastic material layers, that is, the elastic material layers and the bending pieces are mixed to form the blocking layers, thereby achieving an effect of blocking the gap between the V-shaped supports in the soft support structure. In addition, when being bent, the blocking layers can implement good deformation, and do not affect bending of the foldable mechanism.

In the foregoing solution, when an elastic material layer is used as a blocking layer, each elastic material layer and a V-shaped support adjacent to the elastic material layer are an integrated structure. That is, the elastic material layer and a soft support layer are disposed by using a same material. In this case, the soft support structure may be considered as a sheet-like elastic layer in which a plurality of V-shaped slots are provided and a hard support structure is embedded in each V-shaped slot.

In specific disposition, hard support structure may use different structures. In a manner, each hard support structure includes a first support layer blocking an opening of a V-shaped support corresponding to the hard support frame, and a foldable mechanism blocking one end of the V-shaped support exists at either end of the first support layer. That is, the flexible display screen is supported by the first support layer, and openings at two ends of the V-shaped support are blocked by using foldable mechanisms. Therefore, the mobile terminal is prevented from having an exterior gap or hole. This improves the exterior effect of the mobile terminal.

In a solution, the hard support structure further includes an exterior layer disposed on an external sidewall of the foldable mechanism. The exterior layer is disposed to block the gap when the first support layer is connected to the V-shaped support. This further improves the exterior effect of the mobile terminal.

In addition, to enhance support strength of the hard support structure, connection strength between the hard support structure and the soft support structure is improved. In an improved solution, the hard support structure further includes a second support layer wrapping the first support layer, and strength of the second support layer is higher than strength of the first support layer. That is, the first support layer of the hard support structure is made of a material that has a relatively good adhesive effect with the soft support structure and relatively small hardness, but the second support layer may be made of a material that has relatively high support strength. This improves an effect of supporting the flexible display screen by the hard support structure.

Embodiments of the present invention further provide a mobile terminal. The mobile terminal includes a housing and a flexible display screen disposed in the housing, where the housing includes a first housing, a second housing, and the foldable mechanism for implementing folding of the first housing and the second housing according to any one of the foregoing.

In the foregoing technical solution, the foldable mechanism formed by the soft support structure and the hard support structure embedded in the soft support structure is used as a component for connecting the first housing and the second housing. When the mobile terminal is unfolded, the foldable mechanism formed by the soft support structure and the hard support structure is unfolded and turns into a flat structure connected to the first housing and the second housing. When the mobile terminal is folded, one side of the soft support structure away from the hard support structure shrinks inward, and one side of the soft support structure located on the hard support structure is also extended and bent, so that the entire foldable mechanism forms a C-shaped structure to implement bending of the first housing and the second housing. In the foregoing bending process, the flexible screen is supported by the hard support structure, and the shape of the foldable mechanism is changed according to a change of the soft support structure. Therefore, continuity of connections between the foldable mechanism and the first housing and the second housing is improved, the mobile terminal is prevented from having an abrupt exterior structure, and an exterior effect of the mobile terminal is improved.

REFERENCE SIGNS IN THE DRAWINGS

10: flexible display screen; 20: first housing; 30: second housing
40: foldable mechanism; 41: soft support structure; 411: V-shaped support 42: hard support structure; 421: first support layer; 422: foldable mechanism 423: exterior layer; 43: blocking layer; 431: bending piece; 4311: first bending piece 4312: second bending piece; 432: elastic material layer

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
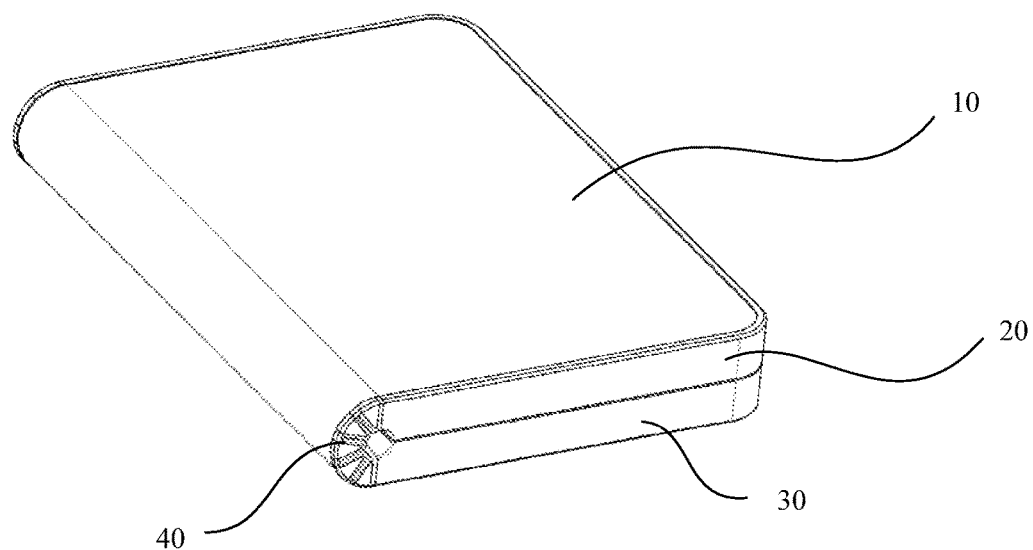
FIG. 1 is a schematic view of a mobile terminal in a folded state according to an embodiment of the present invention.
Figure 3:
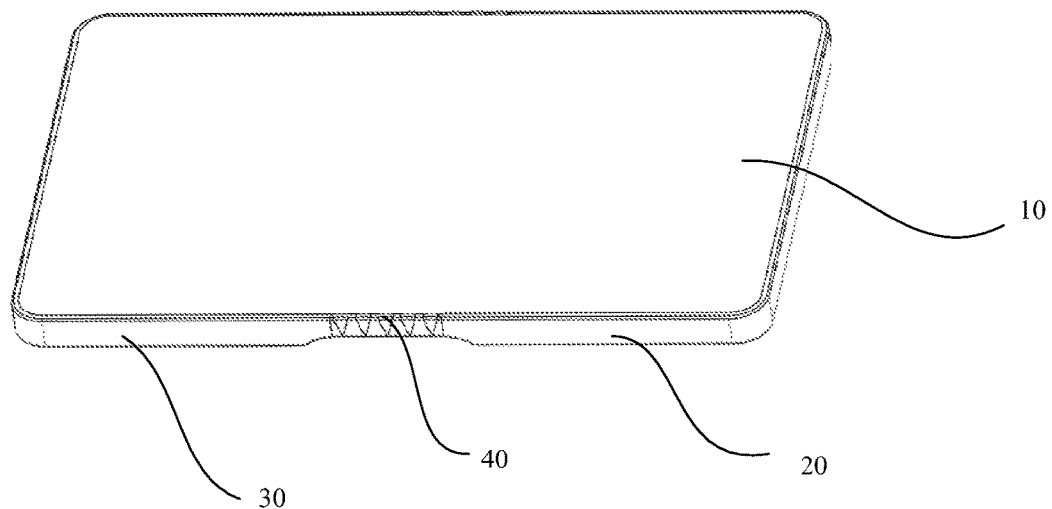
FIG. 3 is a schematic view of a mobile terminal in an unfolded state according to an embodiment of the present invention.

As shown in FIG. 1 and FIG. 3, FIG. 1 and FIG. 3 are schematic views of a mobile terminal in different states according to an embodiment of the present invention.

An embodiment of the present invention provides a foldable mechanism of a mobile terminal. The foldable mechanism is applied to the mobile terminal. The mobile terminal includes a housing and a flexible display screen 10 disposed in the housing. The housing includes a first housing 20, a second housing 30, and the foldable mechanism 40 for implementing folding of the first housing 20 and the second housing 30 according to any one of the foregoing. The first housing 20 and the second housing 30 are connected by the foldable mechanism 40 to form an entirety. The flexible display screen 10 is installed in the housing formed by the first housing 20 and the second housing 30.

Figure 5:
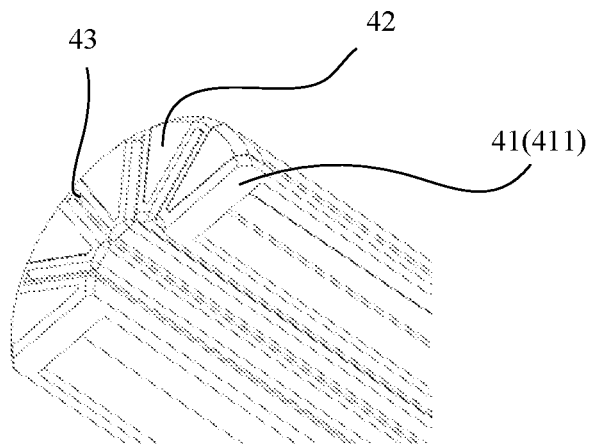
FIG. 5 is a schematic view of a foldable mechanism in a bent state according to an embodiment of the present invention.
Figure 6:
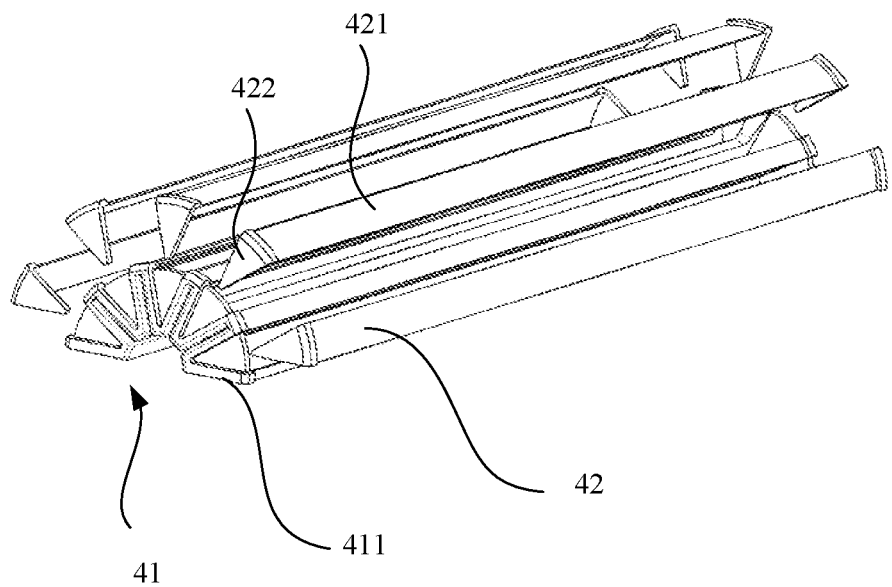
FIG. 6 is a schematic exploded view of a foldable mechanism in a bent state according to an embodiment of the present invention.
Figure 7:
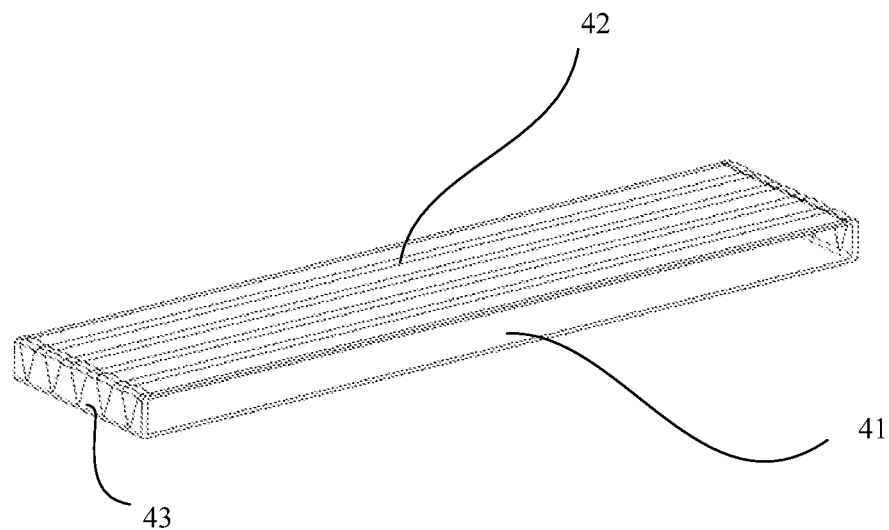
FIG. 7 is a schematic view of a foldable mechanism in an unfolded state according to an embodiment of the present invention.

As shown in FIG. 5, FIG. 6, and FIG. 7, FIG. 5 and FIG. 7 are schematic views of the foldable mechanism 40 in different states, and FIG. 6 is a schematic exploded view of the foldable mechanism 40. The foldable mechanism 40 provided by this embodiment has a bending function. The foldable mechanism 40 may be used to implement bending and unfolding of the first housing 20 and the second housing 30, that is, implement folding and unfolding of the mobile terminal. Specifically, the foldable mechanism 40 includes a soft support structure 41 that connects the first housing 20 and the second housing 30. The soft support structure 41 includes a plurality of V-shaped supports 411 arranged in a single row, and open ends of adjacent V-shaped supports 411 are connected. Specifically, as shown in FIG. 5 and FIG. 6, top positions of sidewalls between two adjacent V-shaped supports 411 are connected, and the plurality of V-shaped supports 411 are connected in sequence, so that the plurality of V-shaped supports 411 are connected to form an entirety. In addition, in specific disposition, a length direction of each V-shaped support 411 is parallel to a direction of rotation of the first housing 20 relative to the second housing 30, that is, in the V-shaped supports 411 arranged in the single row, V-shaped supports 411 located at two ends are connected to the first housing 20 and the second housing 30 respectively. Therefore, when the first housing 20 and the second housing 30 rotate relatively, the V-shaped supports 411 can be deformed, and tip portions of the V-shaped supports 411 move in a direction of convergence. Therefore, the soft support frame forms a structure, with its interior (one side away from the flexible display screen 10) converging and its exterior (facing the flexible display screen 10) being extended.

In addition, in disposition, an opening of each V-shaped support 411 faces the flexible display screen 10, and a hard support structure 42 configured to support the flexible display screen 10 is disposed in each V-shaped support 411. The hard support structure 42 is fixed in a groove part in the V-shaped support 411, and faces the flexible display screen 10. The hard support structure 42, the first housing 20, and the second housing 30 together form a support structure for the flexible display screen 10. In the foregoing description, it should be understood that, "soft" and "hard" in the soft support structure 41 and the hard support structure 42 provided by this embodiment are relative concepts, and are relative features of materials in two parts of structures in the foldable mechanism 40.

In specific disposition, the hard support structure 42 is located in a dented area of the V-shaped support 411, and each hard support structure 42 blocks two ends of a V-shaped support 411 corresponding to the hard support structure 42. The hard support structure 42 is disposed to block openings at the two ends of the V-shaped support 411. Therefore, adverse impact caused by a gap or the like on an exterior surface of the foldable mechanism 40 to an exterior structure of the mobile terminal is avoided, and exterior consistency of the mobile terminal is improved.

In specific disposition, the hard support structure 42 may use different structures. As shown in FIG. 5 and FIG. 6, each hard support structure 42 includes a first support layer 421 blocking an opening of a V-shaped support 411 corresponding to the hard support frame, and a foldable mechanism 422 blocking one end of the V-shaped support 411 exists at either end of the first support layer 421. Specifically, each hard support structure 42 includes one first support layer 421 and one foldable mechanism 422 located at either end of the first support layer 421. The first support layer 421 blocks a top opening position of the V-shaped support 411, and the foldable mechanisms 422 located at the two ends of the first support layer 421 block V-shaped openings at the two ends of the V-shaped support 411 respectively. The first support layer 421 is disposed to support the flexible display screen 10, and the foldable mechanisms 422 are disposed to block the openings at the two ends of the V-shaped support 411, thereby ensuring exterior consistency of the foldable mechanisms 422. An assembled structure is shown in FIG. 5.

Figure 11:
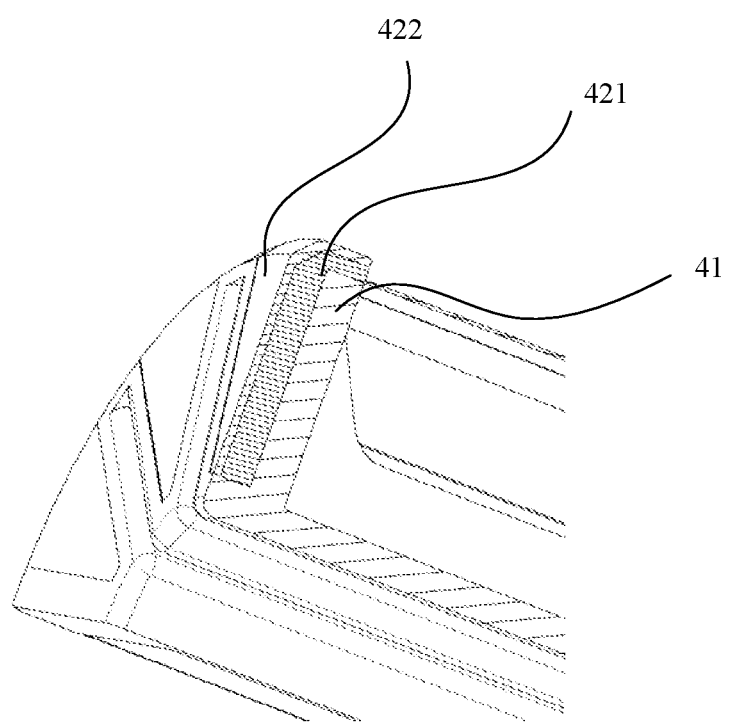
FIG. 11 is a sectional view of a hard support structure according to an embodiment of the present invention.
Figure 12:
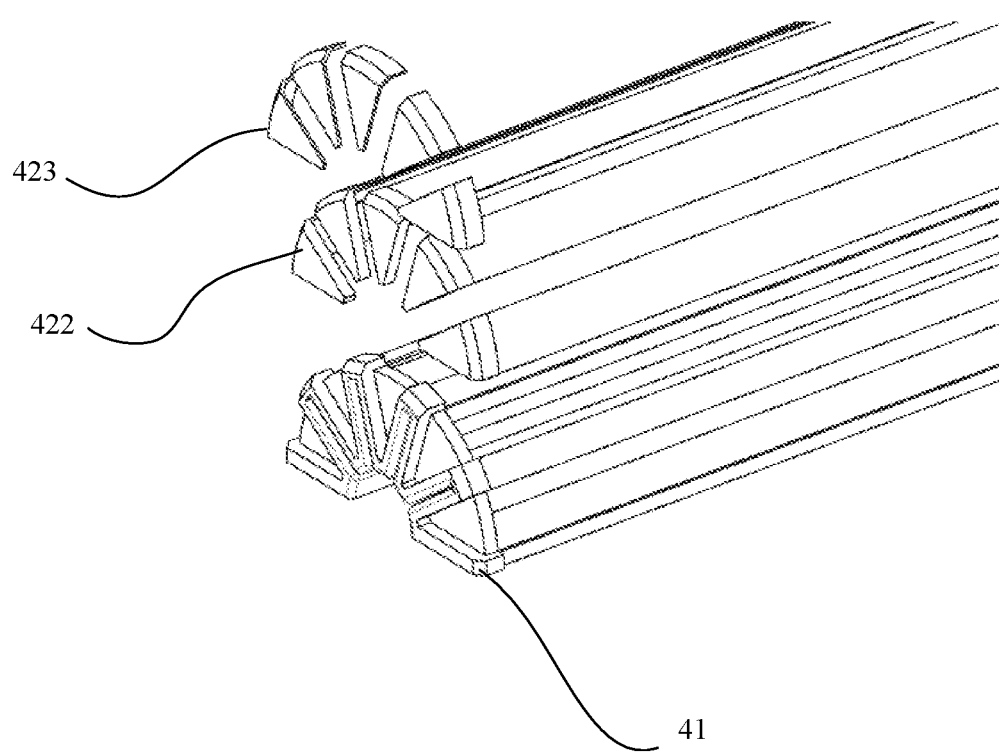
FIG. 12 is a schematic exploded view of a foldable mechanism when the hard support structure shown in FIG. 11 is used according to an embodiment of the present invention.

In addition, to improve structure strength and an exterior effect of the hard support structure 42, preferably, the hard support structure 42 further includes an exterior layer 423 disposed on an external sidewall of the foldable mechanism 422. As shown in FIG. 11 and FIG. 12, the foldable mechanism 422 at either end of the first support layer 421 of each hard support structure 42 is fixedly sleeved with an exterior layer 423. The exterior layer 423 is configured to block a gap at a joint of the foldable mechanism 422 and the V-shaped support 411, thereby improving an exterior effect of the entire foldable mechanism 422. In addition, support strength of the exterior layer 423 is higher than strength of the first support layer 421. This further enhances support strength of the entire foldable mechanism 422. That is, the exterior layer 423 is disposed to block the gap when the first support layer 421 is connected to the V-shaped support 411. This further improves an exterior effect of the mobile terminal.

As a variation of the hard support structure 42 shown in FIG. 11 and FIG. 12, the hard support structure 42 may not only use the foregoing exterior layer 423, but also use a second support layer disposed on the first support layer 421 to improve a support effect and the exterior effect. Specifically, the hard support structure 42 further includes a second support layer wrapping the first support layer 421, and strength of the second support layer is higher than strength of the first support layer 421. Structurally, a structure of the second support layer is the same as a structure of the first support layer 421, that is, both include a support layer and a foldable mechanism 422 disposed at either end of the support layer. In addition, in specific disposition, the second support layer is located on one side of the first support layer 421 away from the V-shaped support 411, and the first support layer 421 and the first support layer 421 are disposed in an overlapping manner, so that the second support layer wraps the first support layer 421, that is, it may be considered that the first support layer 421 and the second support layer are disposed in a sleeving manner. In addition, in specific disposition, strength of the first support layer 421 is lower than strength of the second support layer, that is, the first support layer 421 is made of a low-strength material that cooperates more easily with the V-shaped support 411 made of a soft material, but the second support layer is made of a material of relatively high strength. Use of the foregoing materials and structures ensures a combination of the soft support structure 41 and the hard support structure 42, and also enhances a support effect of the hard support structure 42 for the flexible display screen 10.

Figure 2:
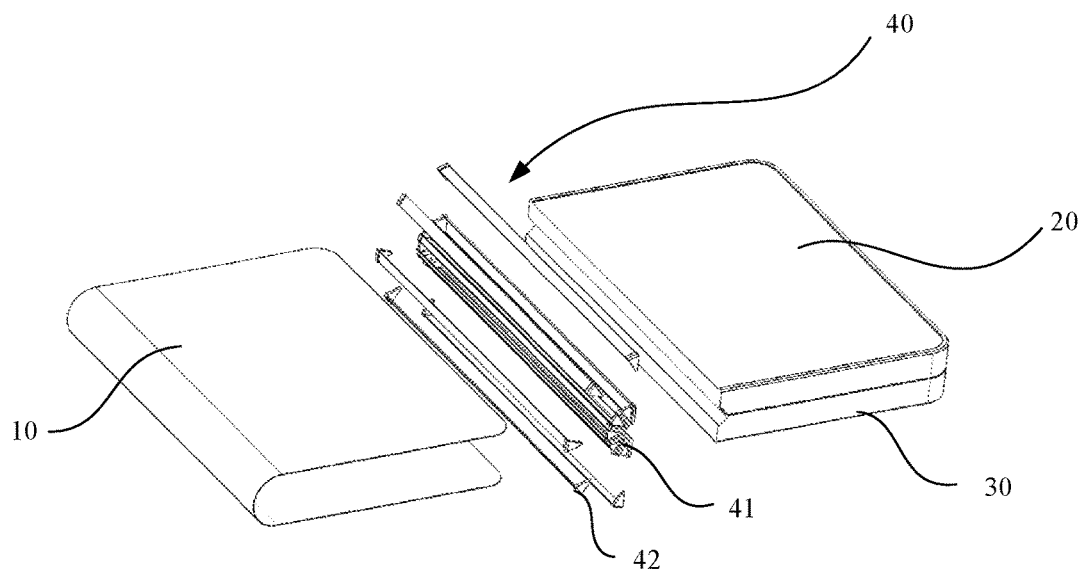
FIG. 2 is a schematic exploded view of a mobile terminal in a folded state according to an embodiment of the present invention.
Figure 4:
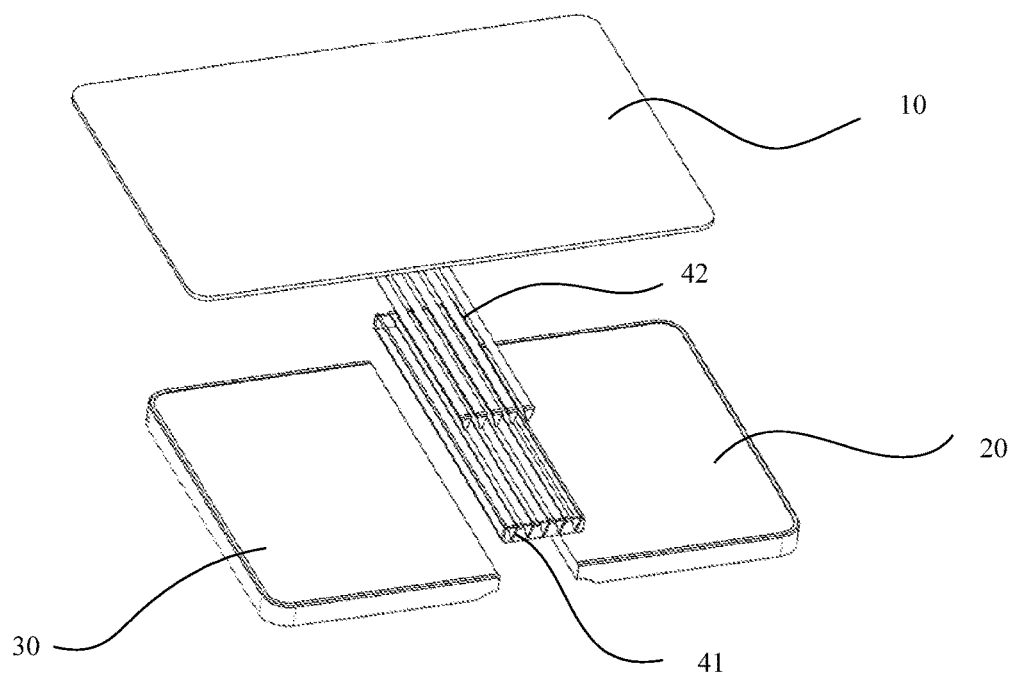
FIG. 4 is a schematic exploded view of a mobile terminal in an unfolded state according to an embodiment of the present invention.
Figure 8:
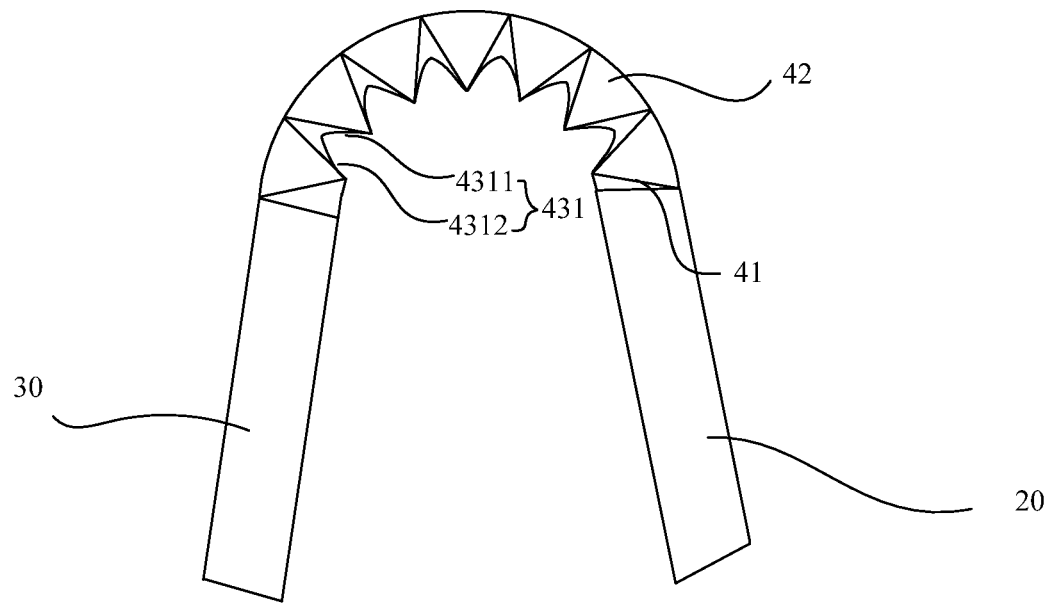
FIG. 8 is a schematic status diagram of a foldable mechanism in a bending process according to an embodiment of the present invention.
Figure 9:
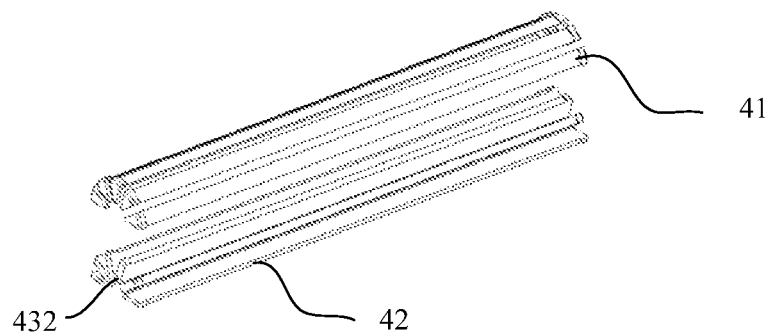
FIG. 9 is a schematic exploded view of another foldable mechanism according to an embodiment of the present invention.
Figure 10:
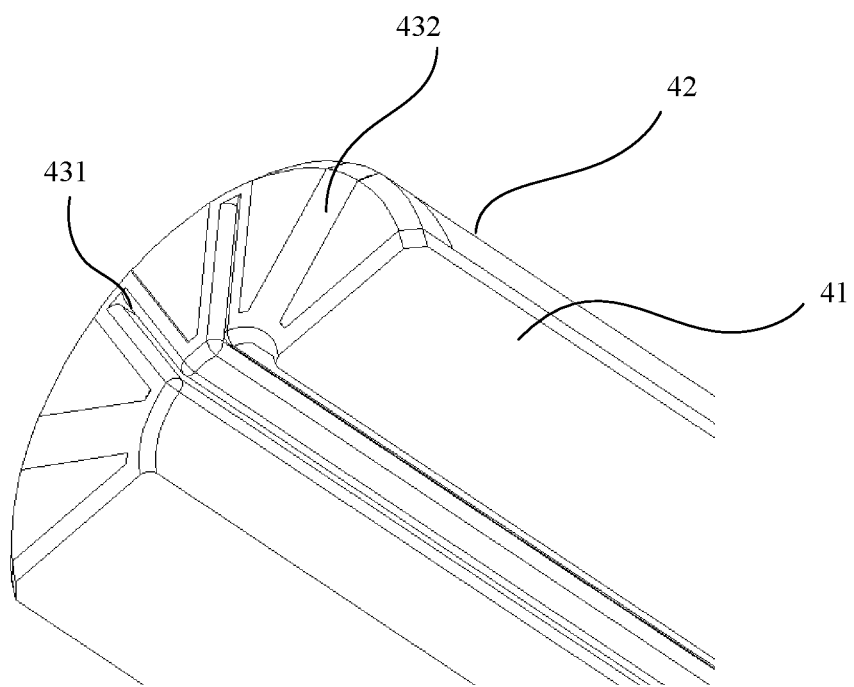
FIG. 10 is a schematic view of a third foldable mechanism according to an embodiment of the present invention.

Referring to FIG. 8, FIG. 9, and FIG. 10, FIG. 8 is a status diagram in a bending process, and is a simplified schematic diagram. The mobile terminal further includes a blocking layer 431 disposed between bending tip portions of any two adjacent V-shaped supports 411. The blocking layer 431 is configured to block a gap between tip portions of the plurality of V-shaped supports 411. As shown in FIG. 1 and FIG. 2, when the mobile terminal is folded, bending tip portions of the plurality of V-shaped supports 411 converge, and each blocking layer 431 is compressed into a gap between two V-shaped supports 411 connected by the blocking layer 431, so that the foldable mechanism 40 forms a C-shaped structure, and that the first housing 20 overlaps the second housing 30 to implement folding of the mobile terminal. As shown in FIG. 3 and FIG. 4, when the mobile terminal is unfolded, the bending tip portions of the plurality of V-shaped supports 411 move away from each other, and each blocking layer 431 is unfolded to block the gap between the two V-shaped supports 411 connected by the blocking layer 431. In this case, the blocking layer 431 is unfolded to block the gap between the tip portions of the V-shaped supports.

In specific disposition, the blocking layer 431 may use different structures to block the gap between the tip portions of the V-shaped supports 411. As shown in FIG. 8, the blocking layer 431 uses a bending piece 431. As shown in FIG. 9, the blocking layer 431 uses an elastic material layer 432. Alternatively, as shown in FIG. 10, some blocking layers 431 use bending pieces 431, and other blocking layers 431 use different structures such as elastic material layers 432 to block the tip portions of the V-shaped supports 411. For ease of understanding, the following describes the structures by using examples separately.

As shown in FIG. 8, in a plurality of blocking layers 431, at least one blocking layer 431 is a bending piece 431. In the structure shown in FIG. 8, a structure in which all blocking layers 431 are bending pieces 431 is shown. However, it should be understood that, the blocking layer 431 may also use a structure different from the bending piece 431. For the bending piece 431, an odd number of creases exist on the bending piece 431, and two ends of the bending piece 431 are respectively connected to bending tip portions of V-shaped supports 411 on two sides of the blocking layer 431 on a one-to-one basis. In addition, the bending piece 431 is disposed in a gap between tip portions of adjacent V-shaped supports 411. Still referring to FIG. 8, FIG. 8 shows a bending status of the bending piece 431 in a bending process. As can be seen from FIG. 8, the crease of the bending piece 431 causes the bending piece 431 to be bent into a gap between tip portions of the adjacent V-shaped supports 411, so that the folded bending piece 431 can shrink in the gap. Therefore, when being bent, the bending piece 431 is prevented from protruding, which otherwise affects an exterior of the foldable mechanism 40. In specific disposition, the number of creases on the bending piece 431 is an odd number, for example, 1, 3, or 5. In use of the odd number of creases, it is ensured that when the bending piece 431 is bent, an outermost end of the bending piece 431 can be flush to the tip portions of the V-shaped supports 411 or shrink in the gap between the V-shaped supports 411, and further, it is ensured that the bending piece 431 does not interfere with the foldable mechanism 40 when the foldable mechanism 40 is bent. In addition, when the mobile terminal is unfolded, the bending piece 431 can be flush to the tip portions of the V-shaped supports 411 as far as possible. This ensures exterior consistency of the mobile terminal, and improves the exterior effect of the mobile terminal. In a specific implementation solution, as shown in FIG. 8, one crease exists on each bending piece 431, that is, the bending piece 431 includes a first bending piece 4311 and a second bending piece 4312. That is, when being bent, the bending piece 431 needs to be bent only once to fit into the gap between the V-shaped supports 411. This improves convenience during deformation, reduces a thickness of the bending piece 431 after the bending piece 431 is folded, and improves an effect after the bending piece 431 is bent.

As a variation of the foldable mechanism 40 shown in FIG. 8, in another solution, a plurality of blocking layers 431 are a bending plate of an integrated structure, a plurality of creases are disposed on the bending plate, the bending tip portions of the plurality of V-shaped supports 411 are fixedly connected to the creases on the bending plate at equal intervals, and an odd number of creases exist between adjacent V-shaped supports 411. In the foregoing structure, it may be considered that when each blocking layer 431 uses a bending piece 431, a plurality of bending piece 431 are connected in sequence to form an integrated structure. When the blocking layers 431 use the bending plate to block the gap formed by tip ends of the plurality of V-shaped supports, a tip portion of a V-shaped support 411 corresponds to a crease on the bending plate, and a bending plate part located on two sides of the tip portion of the V-shaped support 411, when being bent, is attached to a sidewall of the V-shaped support 411. When being bent, a bending plate part located between two V-shaped supports 411 is located in the gap between the V-shaped supports 411. A specific operating principle thereof is similar to that of the bending piece 431 shown in FIG. 8. Details are not further described herein.

In another structure of the blocking layer 431, at least one blocking layer 431 in the plurality of blocking layers 431 includes an elastic material layer 432 disposed between adjacent V-shaped supports 411. As shown in FIG. 9, FIG. 9 is a schematic view of a structure that uses the elastic material layer 432 as the blocking layer 431. In this embodiment, the gap between the adjacent V-shaped supports 411 is filled with the elastic material layer 432. In specific disposition, the elastic material layer 432 may be made of different materials, for example, a material such as rubber or plastic, provided that the material can have good elasticity. After the foldable mechanism 40 is bent, the elastic material layer 432 is compressed and deformed, so that the foldable mechanism 40 can be bent. When being unfolded, the elastic material recovers to an initial state, and can effectively block the gap between the V-shaped supports 411. In a specific implementation, each blocking layer 431 may use an elastic material layer 432. Alternatively, only some blocking layers use elastic material layers 432. Specific disposition may be determined according to an actual situation. In a specific solution, each elastic material layer 432 and a V-shaped support 411 adjacent to the elastic material layer 432 are an integrated structure. That is, the elastic material layer 432 and a soft support layer are disposed by using a same material, and form an integrated structure. In this case, the soft support structure 41 may be considered as a sheet-like elastic material layer in which a plurality of V-shaped slots are provided and a hard support structure 42 is embedded in each V-shaped slot. When the foregoing structure is used, it can be seen that, when the entire soft support structure 41 is disposed, a lateral side is blocked by the elastic material layer 432, and the elastic material layer 432 and the V-shaped support 411 are disposed in an integrated structure, so that when the mobile terminal is unfolded, a lateral side away from the hard support structure 42 may be a smooth side. This further improves the exterior effect of the entire mobile terminal.

In the foregoing description, the blocking layer 431 may use different structures. As shown in FIG. 10, FIG. 10 shows a form of the blocking layer 431 that uses a combination of a bending piece 431 and an elastic material. As can be seen from FIG. 10, some blocking layers 431 use bending pieces 431, and other blocking layers 431 use elastic material layers 432. That is, the elastic material layers 432 and the bending pieces 431 are mixed to form the blocking layers 431, thereby achieving an effect of blocking the gap between the V-shaped supports 411 in the soft support structure. In addition, when being bent, the blocking layers 431 can implement good deformation, and do not affect bending of the foldable mechanism 40.

When the foregoing formed foldable mechanism 40 is used, the foldable mechanism 40 formed by the soft support structure 41 and the hard support structure 42 embedded in the soft support structure 41 is used as a component for connecting the first housing 20 and the second housing 30. As shown in FIG. 3 and FIG. 4, when the mobile terminal is unfolded, the foldable mechanism 40 formed by the soft support structure 41 and the hard support structure 42 is unfolded and turns into a flat structure connected to the first housing 20 and the second housing 30. As shown in FIG. 1 and FIG. 2, when the mobile terminal is folded, one side of the soft support structure 41 away from the hard support structure 42 shrinks inward, and one side of the soft support structure 41 located on the hard support structure 42 is also extended and bent, so that the entire foldable mechanism 40 forms a C-shaped structure to implement bending of the first housing 20 and the second housing 30. In the foregoing bending process, the flexible screen is supported by the hard support structure, and the shape of the foldable mechanism 40 is changed according to a change of the soft support structure 41. Therefore, continuity of connections between the foldable mechanism 40 and the first housing 20 and the second housing 30 is improved, the mobile terminal is prevented from having an abrupt exterior structure, and the exterior effect of the mobile terminal is improved.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A foldable mechanism of a mobile terminal, comprising:
    a soft support structure to connect a first housing and a second housing of the mobile terminal, the soft support structure comprising a plurality of V-shaped supports arranged in a single row, open ends of adjacent V-shaped supports are connected, and an opening of each V-shaped support faces a flexible display screen of the mobile terminal; and
    a hard support structure included in each V-shaped support and configured to support the flexible display screen, wherein each hard support structure blocks two ends of a V-shaped support corresponding to the hard support structure; and further comprising a blocking layer included between bending tip portions of any two adjacent V-shaped supports;
    when the foldable mechanism of the mobile terminal is bent, bending tip portions of the plurality of V-shaped supports converge, and each blocking layer is compressed into a gap between two V-shaped supports connected by the blocking layer; and
    when the foldable mechanism of the mobile terminal is unfolded, the bending tip portions of the plurality of V-shaped supports move away from each other, and each blocking layer is unfolded to block the gap between the two V-shaped supports connected by the blocking layer.

2. The foldable mechanism of the mobile terminal according to claim 1, wherein a plurality of blocking layers are a bending plate of an integrated structure, a plurality of creases are included on the bending plate, the bending tip portions of the plurality of V-shaped supports are fixedly connected to the creases on the bending plate at equal intervals, and an odd number of creases exist between adjacent V-shaped supports.

3. The foldable mechanism of the mobile terminal according to claim 1, wherein at least one blocking layer in a plurality of blocking layers is a bending piece, an odd number of creases exist on the bending piece, and two ends of the bending piece are respectively connected to bending tip portions of V-shaped supports on two sides of the blocking layer on a one-to-one basis.

4. The foldable mechanism of the mobile terminal according to claim 3, wherein one crease exists on each bending piece.

5. The foldable mechanism of the mobile terminal according to claim 1, wherein at least one blocking layer in the plurality of blocking layers comprises an elastic material layer included between adjacent V-shaped supports.

6. The foldable mechanism of the mobile terminal according to claim 5, wherein each elastic material layer and a V-shaped support adjacent to the elastic material layer are an integrated structure.

7. The foldable mechanism of the mobile terminal according to claim 1, wherein each hard support structure comprises a first support layer blocking an opening of a V-shaped support corresponding to the hard support structure, and a foldable mechanism blocking one end of the V-shaped support exists at either end of the first support layer.

8. The foldable mechanism of the mobile terminal according to claim 7, further comprising an exterior layer included on an external sidewall of the foldable mechanism.

9. The foldable mechanism of the mobile terminal according to claim 7, wherein the hard support structure further comprises a second support layer wrapping the first support layer, and strength of the second support layer is higher than strength of the first support layer.

10. A mobile terminal, comprising,
a housing; and
a flexible display screen included in the housing, the housing comprising:
a first housing,
a second housing, and
a foldable mechanism to fold the first housing and the second housing, the foldable mechanism comprising:
a soft support structure to connect the first housing and the second housing of the mobile terminal, the soft support structure comprising a plurality of V-shaped supports arranged in a single row, open ends of adjacent V-shaped supports are connected, and an opening of each V-shaped support faces a flexible display screen of the mobile terminal; and
a hard support structure included in each V-shaped support and configured to support the flexible display screen, wherein each hard support structure blocks two ends of a V-shaped support corresponding to the hard support structure; and further comprising a blocking layer included between bending tip portions of any two adjacent V-shaped supports;
when the foldable mechanism of the mobile terminal is bent, bending tip portions of the plurality of V-shaped supports converge, and each blocking layer is compressed into a gap between two V-shaped supports connected by the blocking layer; and
when the foldable mechanism of the mobile terminal is unfolded, the bending tip portions of the plurality of V-shaped supports move away from each other, and each blocking layer is unfolded to block the gap between the two V-shaped supports connected by the blocking layer.

11. The mobile terminal according to claim 10, wherein a plurality of blocking layers are a bending plate of an integrated structure, a plurality of creases are included on the bending plate, the bending tip portions of the plurality of V-shaped supports are fixedly connected to the creases on the bending plate at equal intervals, and an odd number of creases exist between adjacent V-shaped supports.

12. The mobile terminal according to claim 10, wherein at least one blocking layer in a plurality of blocking layers is a bending piece, an odd number of creases exist on the bending piece, and two ends of the bending piece are respectively connected to bending tip portions of V-shaped supports on two sides of the blocking layer on a one-to-one basis.

13. The mobile terminal according to claim 12, wherein one crease exists on each bending piece.

14. The mobile terminal according to claim 10, wherein at least one blocking layer in the plurality of blocking layers comprises an elastic material layer included between adjacent V-shaped supports.

15. The mobile terminal according to claim 14, wherein each elastic material layer and a V-shaped support adjacent to the elastic material layer are an integrated structure.

16. The mobile terminal according to claim 10, wherein each hard support structure comprises a first support layer blocking an opening of a V-shaped support corresponding to the hard support structure, and a foldable mechanism blocking one end of the V-shaped support exists at either end of the first support layer.

17. The mobile terminal according to claim 16, further comprising an exterior layer included on an external sidewall of the foldable mechanism.

18. The mobile terminal according to claim 16, wherein the hard support structure further comprises a second support layer wrapping the first support layer, and strength of the second support layer is higher than strength of the first support layer.

* * * * *

UNITED STATES PATENT AND TRADEMARK OFFICE
CERTIFICATE OF CORRECTION

PATENT NO.         : 10,310,566 B2
APPLICATION NO.    : 16/119102
DATED              : June 4, 2019
INVENTOR(S)        : Li Liao et al.

Page 1 of 1

It is certified that error appears in the above-identified patent and that said Letters Patent is hereby corrected as shown below:

In the Claims

Column 11, Line 3:
In Claim 10, after "terminal," delete "comprising," and insert -- comprising: --, therefor.

Signed and Sealed this
Twenty-sixth Day of November, 2019

Andrei Iancu
*Director of the United States Patent and Trademark Office*